No. 837,919. PATENTED DEC. 11, 1906.
P. R. DUNCAN.
UPSETTING OR HEADING MACHINE FOR BOLTS, RIVETS, AND THE LIKE.
APPLICATION FILED AUG. 9, 1902.
3 SHEETS—SHEET 1.
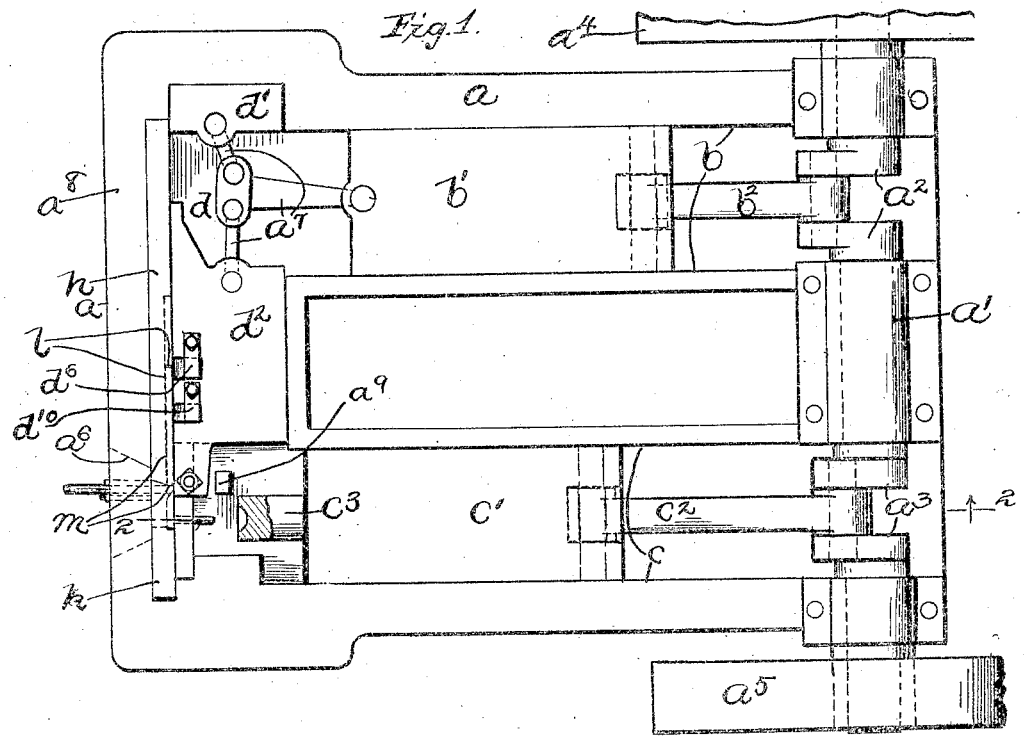
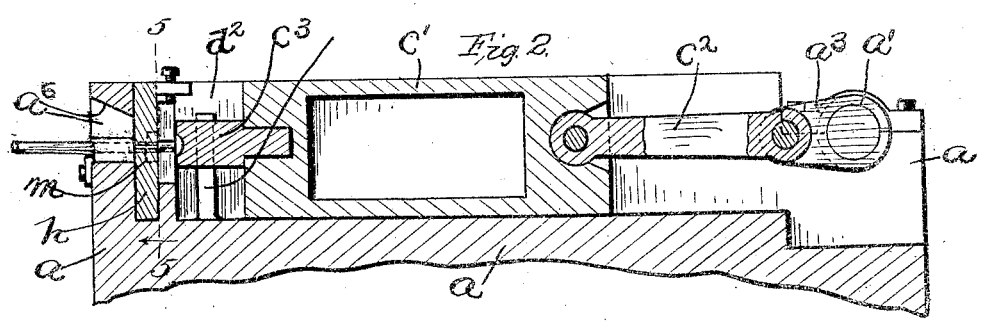
WITNESSES:
Daniel E Daly
Victor C Lynch
INVENTOR
Perry R. Duncan
BY Lynch-Dorr
his ATTORNEYS,

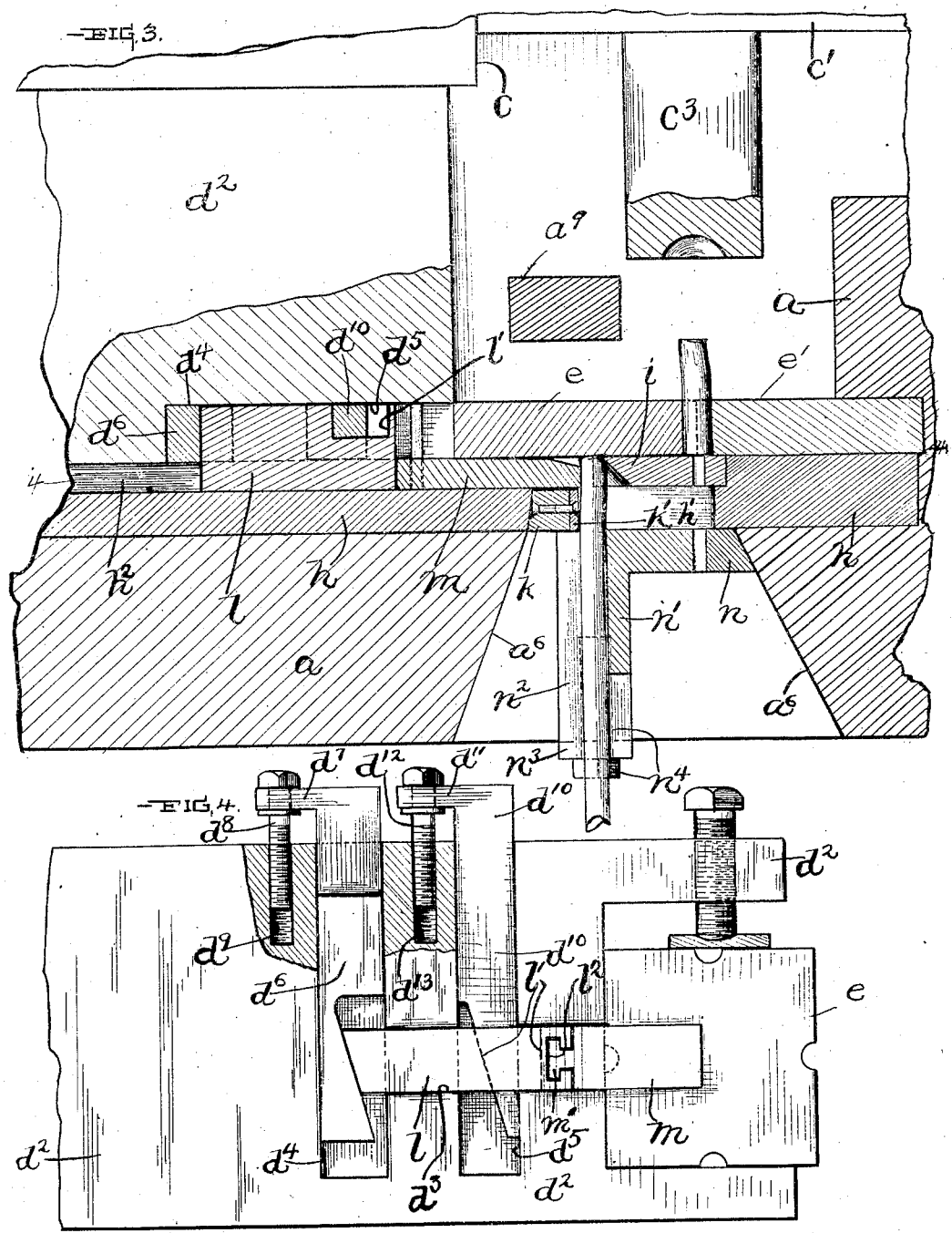

No. 837,919. PATENTED DEC. 11, 1906.
P. R. DUNCAN.
UPSETTING OR HEADING MACHINE FOR BOLTS, RIVETS, AND THE LIKE.
APPLICATION FILED AUG. 9, 1902.
3 SHEETS—SHEET 3.
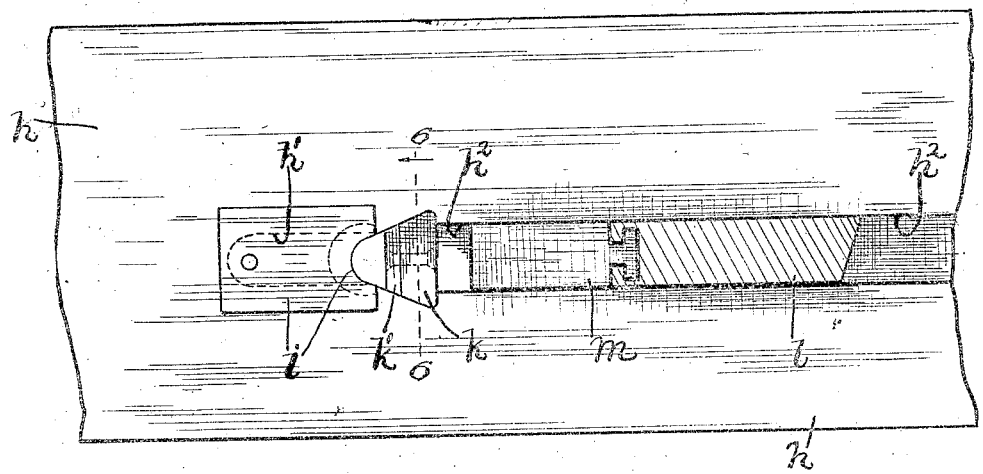
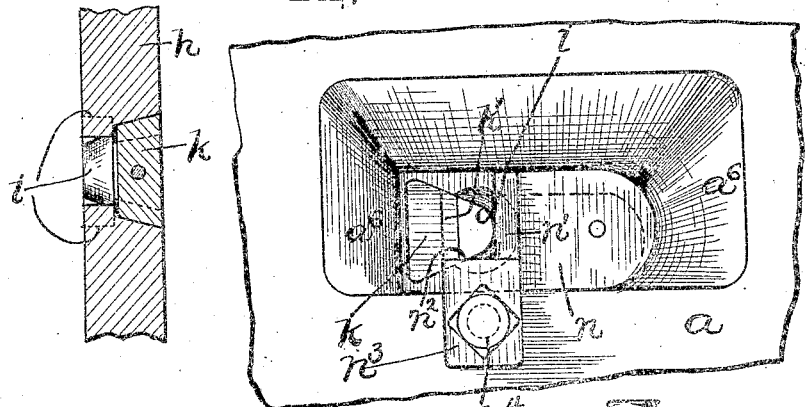
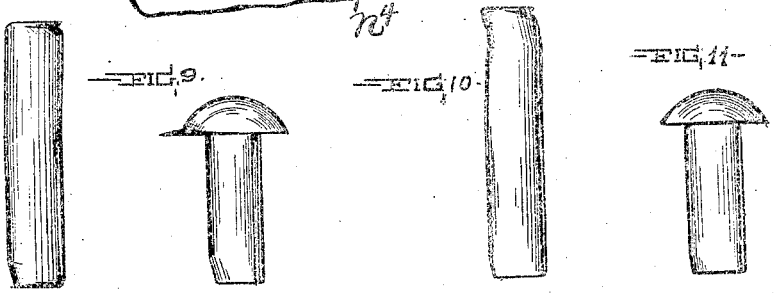
WITNESSES:
Daniel E Daly.
Victor C. Lynch.
INVENTOR
Perry R. Duncan
BY
Lynch & Dorer.
his ATTORNEYS.

UNITED STATES PATENT OFFICE.

PERRY R. DUNCAN, OF CLEVELAND, OHIO, ASSIGNOR, BY DIRECT AND MESNE ASSIGNMENTS, OF ONE-FOURTH TO ALBERT E. LYNCH, ONE-FOURTH TO EDWARD FLYNN, TRUSTEE, AND ONE-HALF TO ALBERT E. LYNCH, TRUSTEE, OF CLEVELAND, OHIO.

UPSETTING OR HEADING MACHINE FOR BOLTS, RIVETS, AND THE LIKE.

No. 837,919.   Specification of Letters Patent.   Patented Dec. 11, 1906.

Application filed August 9, 1902. Serial No. 118,984.

*To all whom it may concern:*

Be it known that I, PERRY R. DUNCAN, a citizen of the United States of America, residing at Cleveland, in the county of Cuyahoga and State of Ohio, have invented certain new and useful Improvements in Upsetting or Heading Machines for Bolts, Rivets, and the Like; and I hereby declare the following to be a full, clear, and exact description of the invention, such as will enable others skilled in the art to which it pertains to make and use the same.

This invention relates to improvements in upsetting or heading machines for bolts, rivets, and the like.

The object of this invention is to provide a machine capable of producing a bolt or rivet having a symmetrically-formed head, such as will not require any finishing after leaving the machine.

The principal difficulty met with in the manufacture of rivets and bolts has been to produce a rivet or bolt having a perfect or symmetrical head free from the flange or flash which is formed around one side of the head during the upsetting process. It is well known to those skilled in the art that when a blank is sheared from a bar by a machine of the type now commonly used the sheared end of the bar is distorted in a peculiar and characteristic manner—that is to say, the pressure of the moving die on one side of the bar and the resistance of the shear on the other side of the bar distort the end of the bar, compressing, as I believe, the side of the bar nearest the moving die and forming a depression of the opposite side and also drawing up the edge of the bar at the side where the depression is formed in the shape of a beak, as shown in Fig. 8 of the drawings. Now when the heading-die is brought down upon the blank it comes in contact first with the side of the blank at which the beak is formed, and the metal is caused to flow toward the side of the blank which is already compressed, thereby causing an excess of material at that side of the head, which, as I believe, produces the flash.

I have discovered that a symmetrical head will be formed on the blank if after each shearing operation the bar is manipulated so as to bend the end thereof in approximately the same degree in the opposite direction to that in which it was bent during the shearing operation, so that the top edge opposite the beak will come in contact with the heading-die first, and that this method of treatment produces an entirely different result to that which is secured by simply straightening the rod each time after it is sheared.

My invention therefore consists in providing a machine of the character indicated, into which the bar may be fed in the usual or normal manner and which will manipulate the end of the bar within the machine during the shearing operation so as to impart to the rod a curve the trend of which is in the opposite direction to that in which the rod was bent by the shearing operation.

My invention also consists in certain features of construction and combination of parts, as illustrated in the drawings and hereinafter described in the specification and pointed out in the claims.

In the accompanying drawings, Figure 1 is a plan view of a bolt or rivet making machine embodying my invention. Fig. 2 is a section on line 2 2, Fig. 1. Fig. 3 is a detail view showing a horizontal section of a portion of the front of the machine. Fig. 4 is a detail view showing a front elevation of the die-block with my device for manipulating the end of the bar secured thereto. Fig. 5 is a section on line 5 5, Fig. 2. Fig. 6 is a section on line 6 6, Fig. 5. Fig. 7 is a detail view in elevation of a portion of the front of the machine. Fig. 8 shows the shape of the blank when sheared by a machine of the usual type. Fig. 9 shows a bolt-head with flash as formed from a blank of the shape shown in Fig. 8. Fig. 10 shows the shape of a blank when sheared by my machine. Fig. 11 shows a completed bolt free from flash, as produced by my machine.

Again referring to the drawings, $a$ designates the stationary horizontally-arranged bed of the machine.

$a'$ represents the main driving-shaft, which is provided with two cranks $a^2$ and $a^3$. On the shaft $a'$ are mounted the driving-wheels $a^4$ and $a^5$. Two guideways $b$ and $c$ are formed in the bed $a$ of the machine and are arranged parallel with each other and perpendicular with the shaft $a'$. A guideway $d$ is formed in the front end of the bed parallel with the shaft $a'$ and in open communication with the guideways $b$ and $c$.

$b'$ represents a toggle-block arranged to slide freely in the guideway $b$, and it is operatively connected with the crank $a^2$ by a pitman $b^2$.

$c'$ represents a plunger-block arranged in the guideway $c$ and operatively connected with the crank $a^3$ by mean of a pitman $c^2$. The front end of the block $c'$ is adapted to receive and grip the heading-die or upsetting-punch $c^3$. In the guideway $d$ is arranged a stationary block $d'$ and a movable die-block $d^2$. The die-block $d^2$ is operatively connected to the stationary block $d'$ and to the toggle-block $b'$ by a toggle device $a^7$. As the block $d'$ is stationary, the movement of the block $b'$ in the guideway $b$ will cause a corresponding movement of the block $d^2$ in the guideway $d$. To the die-block $d^2$ is secured a die $e$ in any approved manner. The other die $e'$, which coöperates with the die $e$ in holding the blank while it is being headed, is rigidly secured in the bed $a$. In the front end of the bed $a$—that is, the end at which the operator stands when feeding the bar to the machine and which I have indicated by the reference-letter $a^8$—is formed a large opening $a^6$. The opening $a^6$ is similar to the opening made in the breastplate of any machine of this character to allow the bar to be inserted, so that the dies can engage therewith. In the guideway $d$, extending along the front wall thereof, is arranged a breastplate $h$, in which is formed an opening $h'$ in line with the opening $a^6$, through which the bar passes when it is being fed to the machine. The breastplate $h$ is formed separately from the front portion $a^8$ only as a matter of convenience, and therefore the front portion $a^8$ and the plate $h$ may be regarded as one piece. The shear-plate $i$, which is about half as thick as the plate $h$, is immovably mounted in a seat formed in the plate $h$, so that the blade thereof extends across one side of the opening $h'$, but leaving the opening $h'$ sufficiently free to permit the bar being shoved therethrough. The face of the shear-plate $i$ is arranged flush with the face of the plate $h$, so that it will offer no impediment to the movement of the die $e$ in the guideway $d$. The movement of the die $e$ across the face of the shear-plate $i$ shears the blank from the bar, as in all machines of this particular style.

In the face of the plate $h$ which is toward the die-block $d^2$ is formed a horizontal groove $h^2$, which communicates with the opening $h'$. The groove $h^2$ has a depth equal to about half the thickness of the plate $h$. In the face of the die-block $d^2$ which is toward the plate $h$ is formed a horizontal groove $d^3$, (see Fig. 4,) arranged to register with the groove $h^2$ in the plate $h$. In the same face of the die-block $d^2$ in which the horizontal groove $d^3$ is formed are also formed two vertical grooves $d^4$ and $d^5$, which communicate with the horizontal groove $d^3$. In the vertical groove $d^4$ is arranged a bar $d^6$, on the upper end of which is formed a horizontal flange $d^7$. In the flange $d^7$ is secured an adjusting-screw $d^8$, which engages with a thread $d^9$, formed in the die-block $d^2$. The lower end of the bar $d^6$ is made in the form of an inverted wedge—that is to say, the bar at the side next to the groove $d^5$ is cut away, so that the bar is greatly reduced at a point somewhat below its center and then increases in thickness toward the bottom. In the vertical groove $d^5$ is arranged a bar $d^{10}$, on the upper end of which is formed a horizontal flange $d^{11}$, in which is secured an adjusting-screw $d^{12}$, which engages with a thread $d^{13}$, formed in the die-block $d^2$. The lower end of the bar $d^{10}$ is also wedge-shaped—that is to say, the bar is cut away at its lower end, forming a chisel edge, the beveled face of which is parallel with the adjacent face of the lower end of the bar $d^4$.

In the guideway formed by the two grooves $h^2$ and $b^3$ is arranged a plate $l$. One edge of the plate $l$ is beveled and abuts against the lower end of the bar $d^6$. In the plate $l$ is formed an opening $l'$, arranged so that the end of the bar $d^{10}$ will pass therethrough. By properly adjusting the bars $d^6$ and $d^{10}$ the plate $l$ can be securely locked to the block $d^2$. To the front end of the plate $l$ is secured a plunger $m$, which lies entirely within the groove formed in the breastplate $h$. The plunger $m$ is secured to the plate $l$ by means of a T-shaped lug $m'$, which is formed integral with the plunger $m$, and which enters a T-shaped groove $l^2$, formed in the end of the plate $l$. The forward end of the plunger $m$ is slightly beveled, so that it will strike a little below the sheared end of the rod.

A stop or bumper $k$ is arranged in the seat formed in the front surface of the plate $h$ at the side of the opening $h'$ opposite to the edge of the shear-plate $i$. This stop $k$ is preferably wedge-shaped in both cross and vertical section and extends about half-way through the plate $h$. To the stop $k$ is removably secured a plate $k'$, which forms a facing which can be taken off when it becomes worn or abraded and replaced by a new plate. The object of this stop is to prevent the end of the rod from bending or buckling too much.

In the opening $a^6$ in the front end of the machine-bed $a$ is mounted a vertical plate $n$, which fits snugly into the said opening $a^6$ at one side thereof and with its inner face flush with the outer face of the plate $h$ and with its vertical edge in line with the edge of the shear-plate $i$. A guideway comprising a vertical side portion $n'$ and a horizontal bottom portion $n^2$, formed integral with the plate $n$, extends out to the mouth of the opening $a^6$. At the outer end of the bottom portion $n^2$ is formed a depending flange $n^3$, which is secured to the bed of the machine by a bolt $n^4$.

The operation of the machine is as follows: The bar or rod from which the blanks are to be sheared after being heated is fed to the machine through the guideway in the opening $a^6$ until it comes in contact with the stop-gage. The block $d^2$ is then advanced, bringing the die $e$ in contact with the end of the rod and the continued movement of the die shears the blank and carries it over and clamps it against the stationary die $e'$ in position to be headed. When the movable die has about reached the limit of its forward movement, the plunger $m$, which is secured to the plate $l$, which in turn is clamped to the movable die-block by the bars $d^6$ and $d^{10}$, is brought into contact with the end of the rod. Now when the plunger $m$ strikes the rod as the rod is braced at its end by the shear-blade and by the plate $n$ at a point below where the plunger strikes it the rod is caused to bend in the opposite direction to that in which it was bent when the blank was sheared. As the end of the rod will be bent more or less during the shearing operation, depending on the sharpness of the shearing device, the stroke of the plunger must be regulated accordingly in order to bend the rod to a corresponding degree in the opposite direction. This adjustment is accomplished by raising or lowering the bars $d^6$ and $d^{10}$ by means of the respective screws $d^8$ and $d^{12}$, thereby shoving out or drawing back the plate $l$, which in turn causes the plunger $m$ to exert pressure on the end of the bar for a longer or shorter period.

What I claim is—

1. In an upsetting-machine, the combination of a bed, an upsetting-punch, a stationary shearing-die, a movable die, means for actuating the same, a plunger movable toward and from the stationary shearing-die and arranged to come in contact with the stock-rod at a point below where it has been sheared and means for supporting the stock-rod on the side opposite to that on which the plunger strikes above and below the points at which the plunger strikes so that the impact of the plunger will bend the rod between the points of support.

2. In an upsetting-machine, the combination of a bed, an upsetting-punch, a stationary shearing-die, a movable die, means for actuating the same, a plunger movable toward and from the stationary shearing-die and arranged to contact with the stock-rod at a point below where it has been sheared, means for supporting the stock-rod on the side opposite to and above and below the point at which the plunger strikes so that the impact of the plunger will bend the rod between the points of support and means for adjusting the travel of said plunger.

3. In an upsetting-machine, the combination with an upsetting-punch of a breast-plate, a support, a stationary shearing-die, said support and said die being so formed as to support the stock-rod at one side at two points, leaving the portion of said stock-rod between the two points unsupported, a movable die, means for actuating the same, a plunger movable toward and from the stationary shearing-die and arranged to contact with the stock-rod between and on the opposite side of the two points of support thereof and mechanism for actuating said plunger to crowd the stock-rod into the space between the two points of support thereof.

4. In an upsetting-machine, the combination with an upsetting-punch of a breast-plate, a support, a stationary shearing-die, said support and said die being so formed as to support the stock-rod on one side at two points, leaving the portion of the stock-rod between the said two points unsupported, a movable die, means for actuating the same, a plunger movable toward and from the stationary shearing-die and arranged to contact with the stock-rod between and on the opposite side of the two points of support thereof and mechanism for actuating the said plunger to crowd the stock-rod into the space between the two points of support thereof and means for adjusting said mechanism so as to increase or decrease the travel of said plunger in order to regulate the crowding of the stock-rod.

5. In an upsetting-machine, the combination with an upsetting-punch of a breast-plate, a support, a stationary shearing-die, mounted thereon, said support and die being so formed as to support the stock-rod on one side at two points, a movable die, means for actuating the same, a plunger mounted in the breastplate and movable toward and from the stationary shearing-die and arranged to contact with the stock-rod between and on the opposite side of the two points of support thereof and mechanism for actuating the said plunger to crowd the stock-rod into the space between the two points of support thereof and means for adjusting said mechanism for actuating the plunger so as to increase or decrease the travel of said plunger in order to regulate the crowding of the stock-rod.

6. In a machine for heading bolts, rivets and the like, wherein the blank to be headed is sheared from a continuous rod, a bed, a face-plate arranged in the front part of said bed, an opening formed in said face-plate, a shear-plate seated in said face-plate so as to extend across one side of said opening, a groove formed in the inner surface of said face-plate and communicating with the said opening, a stop removably secured in the said opening at the side opposite the shear-plate, a die-block, a die secured to said die-block, and arranged to travel across the face of said shear-plate, a groove formed in said die-block so as to register with the groove in the said face-plate, a plate arranged in the groove in the said die-block and extending into the groove in the face-plate, a plunger secured to said plate and arranged to enter the said opening in the face-plate when the said plate is advanced, and means for securing the said plate to the said die-block, substantially as described and for the purpose set forth.

7. In a machine for heading bolts, rivets and the like, wherein the blank to be headed is sheared from a continuous rod, a bed, a face-plate arranged in the front part of said bed, an opening formed in said face-plate through which the rod is fed to the machine, a shear-plate seated in said face-plate so as to extend across one side of said opening, a groove formed in the inner surface of said face-plate and communicating with the said opening through the side wall thereof, a stop mounted in said opening at the side opposite the shear-plate, a removable facing secured to said stop, a die-block, a die secured to said die-block and arranged to travel across the face of the said shear-plate, a groove formed in said die-block and arranged to register with the groove in said face-plate, a plate arranged in the guideway formed by the said grooves, a plunger secured to said plate and lying entirely within the groove in the face-plate and means for securing said plate to the die-block, for the purpose set forth.

8. In a machine for heading bolts, rivets and the like, wherein the blank to be headed is sheared from a continuous rod, a bed, a face-plate arranged in the front part of said bed, an opening formed in said face-plate, a shear-plate seated in said face-plate so as to extend across one side of said opening, a groove formed in the inner surface of said face-plate and communicating with said opening through the side wall thereof, a die-block, a die secured to said die-block and arranged to travel across the face of the said shear-plate, a groove formed in said die-block so as to register with the groove in the said face-plate, a plate arranged in the guideway formed by the said grooves, a plunger secured to said plate and lying entirely within the groove in the face-plate, and means for adjustably securing the said plate to the said die-block, for the purpose set forth.

9. In a machine for heading bolts, rivets, and the like, wherein the blank to be headed is sheared from a continuous rod, a bed, a face-plate arranged in the front part of said bed, an opening formed in said face-plate through which the rod is fed to the machine, a shear-plate seated in said face-plate so as to extend across one side of said opening, a groove formed in the inner surface of said face-plate and communicating with the said opening through the side wall thereof, a die-block, a die secured to said die-block and arranged to travel across the face of said shear-plate, a horizontal groove formed in said die-block and arranged to register with the groove in said face-plate, a plate arranged in the groove in said die-block and extending into the groove in said face-plate, said die-block having two vertical grooves communicating with the horizontal groove in said die-block, and bars mounted in said vertical grooves and arranged to engage with and lock said plate in the said horizontal groove, substantially as described and for the purpose set forth.

10. In a machine for heading bolts, rivets and the like, wherein the blank to be headed is sheared from a continuous rod, a bed, a face-plate arranged in the front part of said bed, an opening formed in said face-plate through which the rod is fed to the machine, a shear-plate seated in said face-plate so as to extend across the side of said opening, a groove formed in the inner surface of said face-plate and communicating with the said opening through the side wall thereof, a die-block, a die secured to said die-block and arranged to travel across the face of said shear-plate, a horizontal groove formed in said die-block and arranged to register with the groove in said face-plate, a plate arranged in the horizontal groove in the said die-block, and extending into the groove in the said face-plate, said die-block having two vertical grooves communicating with the horizontal groove in the said die-block, bars mounted in said vertical grooves, and provided with oppositely-arranged wedge-shaped ends arranged to engage with the said plate, means for raising and lowering said bars so as to adjust the said plate in the said horizontal groove in said die-block, and a plunger secured to the said plate and lying entirely within the groove in the face-plate, substantially as described and for the purpose set forth.

11. In a machine for heading bolts, rivets and the like, wherein the blank to be headed is sheared from a continuous rod, a bed, a face-plate arranged in the front part of said bed, an opening formed in said face-plate through which the rod is fed to the machine, a shear-plate seated in said face-plate, so as to extend across one side of said opening, a groove formed in said face-plate and communicating with the said opening in the said face-plate through the side wall thereof, a die-block, a die secured in said die-block and arranged to travel across the face of said shear-plate, a plate secured in said die-block and extending into the said groove in the said face-plate, and a plunger removably secured to said plate and arranged to enter the said opening in the said face-plate when the said die-block is advanced, substantially as described and for the purpose set forth.

12. In a machine for heading bolts, rivets, and the like, wherein the blank to be headed is sheared from a continuous rod, a bed, a face-plate arranged in the front part of said bed, an opening formed in said face-plate, a shear-plate seated in said face-plate so as to extend across one side of said opening, a groove formed in the inner surface of said face-plate and communicating with the said opening, a die-block, a die secured to said die-block and arranged to travel across the face of said shear-plate, a plate secured to said die-block and arranged to extend into the groove formed in the said face-plate, a T-shaped groove formed in the end of said plate, a plunger arranged entirely within the groove in said face-plate, and a T-shaped lug formed on said plunger and arranged to fit into the groove formed in the said plate, substantially as described and for the purpose set forth.

13. In a machine for heading bolts, rivets, and the like, wherein the blank to be headed is sheared from a continuous rod, a bed, an opening formed in the front end of said bed, a face-plate arranged in said bed behind said opening, an opening formed in said face-plate through which the rod is fed to the machine, a shear-plate seated in said face-plate so as to extend across one side of said opening in said face-plate, a stop arranged in the said opening in said face-plate at the opposite side from the said shear-plate, a plate arranged in the opening in the said bed and having a vertical edge in line with the shear-plate, a groove formed in the inner face of said face-plate and communicating with said opening in the said face-plate through the wall thereof, a plunger arranged in said groove, and means for reciprocating the said plunger in said groove, for the purpose set forth.

14. In a machine for heading bolts, rivets and the like, wherein the blank to be headed is sheared from a continuous rod, a bed, an opening formed in the front part of said bed, a face-plate arranged in said bed behind said opening, an opening formed in said face-plate through which the rod is fed to the machine, a shear-plate seated in said face-plate, so as to extend across one side of said opening, in said face-plate, a stop arranged in the said opening in said face-plate at the opposite side from the said shear-plate, a plate arranged in the opening in the said bed and having a vertical edge in line with the cutting edge of the said shear-plate, a guideway secured to the said last-mentioned plate and extending out to the mouth of the opening in the said bed, a groove formed in the inner surface of the said face-plate and communicating with the said opening in the said face-plate through the said wall thereof, a plunger arranged in said groove and means for reciprocating the said plunger in said groove, for the purpose set forth.

15. In an upsetting-machine, the combination with an upsetting-punch, of a breast-plate, a stationary shearing-die mounted thereon, said plate and die being so formed as to support the stock-rod on one side at two points; a movable die, means for actuating the same, a plunger mounted in the breastplate and movable toward and from the stationary shearing-die and arranged to contact with the stock-rod between, and on the opposite side of, the two points of support thereof, and mechanism for actuating said plunger to crowd the stock-rod into the space between the two points of support thereof.

16. In an upsetting-machine, the combination with an upsetting-punch, of a breast-plate, a stationary shearing-die mounted on said breastplate, said plate and die being so formed as to support the stock-rod on one side at two points a plunger mounted in the breastplate and movable toward and from the stationary shearing-die and arranged to contact with the stock-rod between, and on the opposite side of, the two points of support thereof, a movable shearing-die, a carrier therefor, and an adjustable abutment on said carrier and arranged to engage said plunger to crowd the stock-rod into the space between the two points of support thereof.

In testimony whereof I sign the foregoing specification, in the presence of two witnesses, this 21st day of July, 1902, at Cleveland, Ohio.

PERRY R. DUNCAN.

Witnesses:
  VICTOR C. LYNCH,
  G. M. HAYES.